(12) United States Patent
Kozawa et al.

(10) Patent No.: US 7,160,645 B2
(45) Date of Patent: Jan. 9, 2007

(54) LEAD-ACID BATTERY HAVING AN ORGANIC POLYMER ADDITIVE AND PROCESS THEREOF

(76) Inventors: Akiya Kozawa, 39 Youke Ukino, Chiaki-Cho, Ichinomiyashi, Aichi-Ken (JP); Hirofum Hrada, c/o Takehara Corp. 25-1 Ohmoni, Oaza Niwa, Ichinomiyashi, Aichi-Ken (JP); Giym Yoko, 684 Ohaza Fumitsa, Komaki, Aichi-Ken (JP)

( * ) Notice: Subject to any disclaimer, the term of this patent is extended or adjusted under 35 U.S.C. 154(b) by 373 days.

(21) Appl. No.: 10/634,592

(22) Filed: Aug. 5, 2003

(65) Prior Publication Data

US 2004/0033422 A1 Feb. 19, 2004

(51) Int. Cl.
*H01M 6/04* (2006.01)
(52) U.S. Cl. .................. 429/204; 429/225; 429/307; 429/306; 429/309; 429/317
(58) Field of Classification Search ................ 429/306, 429/307, 309, 317, 225, 122, 50, 188, 204
See application file for complete search history.

(56) References Cited

U.S. PATENT DOCUMENTS

| | | | |
|---|---|---|---|
| 5,958,623 A | | 9/1999 | Kozawa |
| 6,475,676 B1 | * | 11/2002 | Sawai ...................... 429/248 |
| 6,485,867 B1 | * | 11/2002 | Navarrete et al. .......... 429/249 |

FOREIGN PATENT DOCUMENTS

| | | | |
|---|---|---|---|
| JP | 2001-313064 | * | 11/2001 |
| WO | WO 97/47702 | * | 12/1997 |
| WO | WO 02/28955 | * | 4/2002 |

OTHER PUBLICATIONS

Taguchi et al. Role of lignin on depressing of anomalous growth of Pb negative electrode during charge-discharge cycling. Nippon Kinzoku Gakkaishi, 61 (1), pp. 77-82, 1997. (Article and abstract).*

* cited by examiner

*Primary Examiner*—Laura Weiner
(74) *Attorney, Agent, or Firm*—Cornelius Obrien (57) ABSTRACT

A process for prolonging the life of a lead-acid battery by adding an organic polymer and ultra fine lignin to its electrolyte and then discharging the battery at a high current rate and the battery so produced.

6 Claims, 4 Drawing Sheets

LEAD-ACID BATTERY HAVING AN ORGANIC POLYMER ADDITIVE AND PROCESS THEREOF

FIELD OF THE INVENTION

A lead acid battery having an electrolyte containing an additive of a polyvinyl alcohol and/or organic polymer with an ultra fine lignin that will permit the lead-acid battery to be recharged to prolong the useful life of the battery and a process thereof.

BACKGROUND OF THE INVENTION

Lead-acid batteries are being widely used for cars, trucks, buses, forklifts, golf carts and the like. The lead-acid batteries can also be used for solar power generated electricity storage and in hybrid cars in the near future. The total use of this type of battery could soon be extremely large and could pose an environment problem. Therefore, it is desirable to recycle these batteries and extend their service life. However, the recharging of these batteries is costly and not completely effective.

It is an important object of the invention to prolong the life of lead-acid batteries by providing an additive to the electrolyte that will permit the batteries to be recharged for many additional years of service.

It is another object of the invention to provide a novel additive to the electrolyte of a used battery that will permit the battery to be recharged to effectively enhance its new power properties.

It is another object of the invention to provide a process for recharging a used lead-acid battery to prolong its use life by adding a novel additive to the electrolyte before or after the recharging process.

SUMMARY OF THE INVENTION

In one embodiment of the invention, the claim relates to an electrochemical lead-acid battery having an electrolyte containing an additive of an organic polymer and an ultra fine lignin, preferably an additional additive or agent for antiforming and said additional additive selected from the group consisting of indium, tin, lead sulfate, barium sulfate, surfactants and mixtures thereof. For most applications, a 5% aqueous polyvinyl alcohol solution should be added in an amount between about 1 cc and about 10 cc, per 12-volt 50-Ampere hour battery, preferably between 2 cc and about 6 cc, and more preferably, between 3 cc and about 5 cc. Preferably, the polymer could be used in a powder form or an aqueous solution having an organic polymer of between about 0.1% and about 13%, preferably between about 2% and about 5% and more preferably about 3.5% in water. An addition of an antiforming additive could be used in an amount preferably between about 0.01% and about 0.1% per 12-volt 50-Ampere hour battery, more preferably about 0.02 and about 0.05.

Polyvinyl alcohol, acrylic polymer and ultra fine lignin do not effectively dissolve in water or in the battery using an acid electrolyte composed of $H_2SO_4$ (5M $H_2SO_4$, 28% by volume of $H_2SO_4$). In such cases, in order to quickly produce a soluble polymer powder, 6% to 12% $Na_2SO_4$ would be mixed, and this procedure would be for most applications. Suitably antiforming additives are the compounds of indium, such as indium oxide and indium sulfate, or tin compounds such as tin sulfate, tin oxide and divalent tin; and fine colloids of barium sulfate and lead sulfate. Lignin is a complex substance known to be non-polysaccharides. The constitution of lignin has not been clarified but is probably a polymerized coniferyl alcohol.

Coniferyl Alcohol

OR

-continued

The fine lignin is preferably sized between about 0.01 and 0.8 microns and contains about 0.01 and about 3 wt percent of the electrolyte. Preferably, the size of the lignin is between 0.1 and 0.6 microns.

Another embodiment of the invention is a process of regenerating a lead acid battery containing an electrolyte such as $H_2SO_4$, comprising the following steps: 1) adding to the electrolyte of a deteriorated battery having a specific gravity less than 1.2, an additive of a polyvinyl alcohol and/or an acrylic polymer and an ultra fine lignin; and 2) after long charge at low current at a period of time sufficient for attaining the power for discharging the battery at a high current rate at least 0.3 C, preferably about 5 C for a time period of between one and 10 minutes, 3) then the battery is charged normal way to increase the specific gravity of the electrolyte by at least 3% or to greater than 1.22, preferably greater than between about 1.26 and about 1.28. For a new battery, the discharging step can be done immediately. If discharge is slow, then the concentration of $Pb^{++}$ ion around the electrode surface is low and $Pb^{++}+SO_4^=$ forms a $PbSO_4$ precipitate slowly. In this situation, the size of the $PbSO_4$ precipitate crystal is large and thus it is a poor active material since its surface area is low. In a high current discharge process in accordance of this invention, the concentration is large and thus the $Pb^{++}+SO_4^= \rightarrow PbSO_4$ precipitate proceeds quickly producing very fine solid precipitates in the size between about 0.5 and about 2 microns. This fine $PbSO_4$ crystals have large surface areas and are very active material for batteries. The high rate discharge can preferably be done periodically (one to 3 times a year) to maintain good active state of the battery. The activation of the battery using the additives (polymer and fine lignin) and a high rate discharge can increase the life of automobile batteries up to three times; bus or truck batteries for 3 years to 5 years and forklift battery for 4 years to 10 years.

Gases, such as $H_2$, may create foam during the charge of the battery and thus it is preferably, to add an antiforming agent, such as silicone compounds, indium, tin, lead sulfate, barium sulfate and mixtures thereof. For most applications the 5% polyvinyl alcohol in water should be added in an amount between about 1 cc and about 10 cc per cell per 12-volt 50-Ampere hour battery, preferably between 3 cc and 7 cc and more preferably about 5 cc. Polyvinyl alcohol polymer could be used in a powder form or an aqueous solution having an organic polymer of between about 0.1% and about 13%, preferably between about 2% and about 5% and most preferably about 3% per 12-volt 50-Ampere hour battery. If required, the antiforming agent for the process could be added in an amount between about 0.01 gram and about 0.1 gram per 12-volt 50-Ampere battery, more preferably about 0.05 and about 0.08 gram.

Another embodiment of the invention is to add the novel additives to a lead-acid battery before it is charged so that charging of the battery can occur during its use. This would entail adding the novel additives to the electrolyte along with its other conventional components before the initial charging of the battery. In most applications, the lignin and, if desired, an antiforming agent could also be added to the electrolyte before the initial discharge at high rate of current. Preferably, the high rate discharge and the charging cycle can be repeated more than once.

Figure 4:
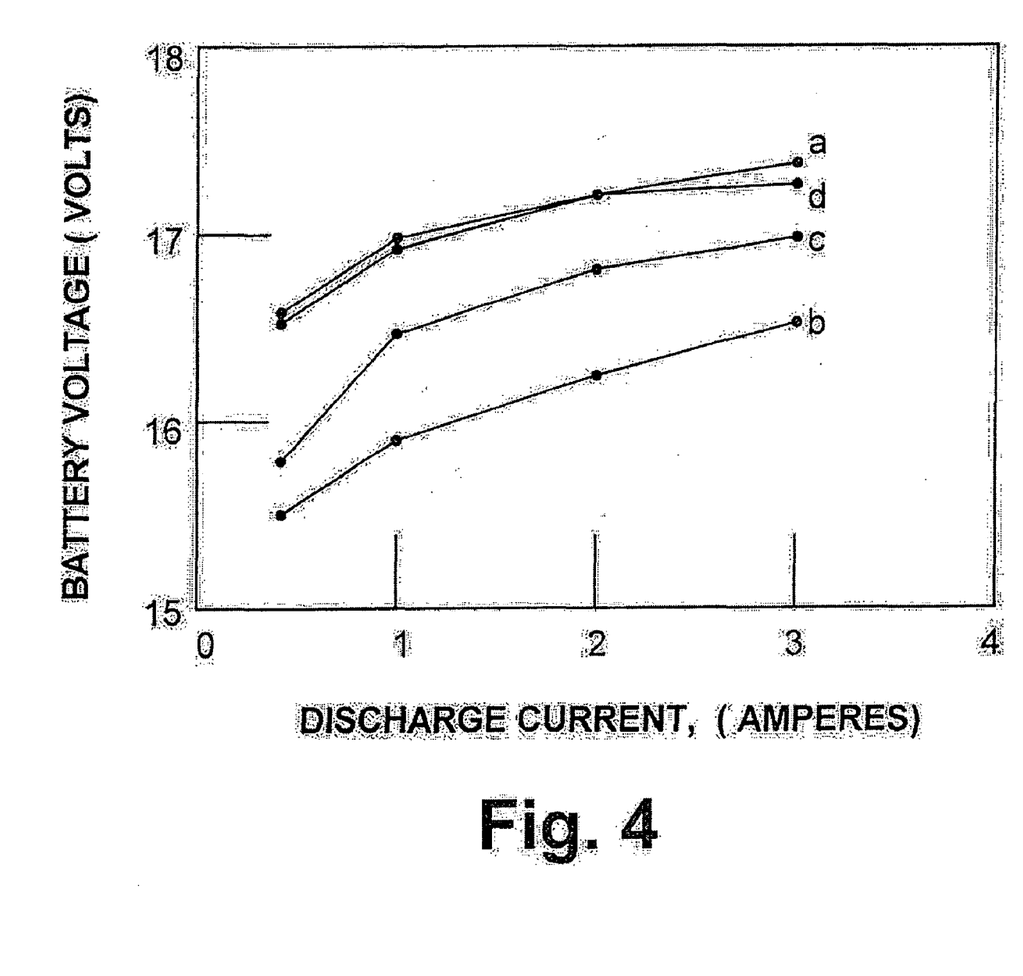
FIG. 4 shows plots of the volts versus charge current for a 12-volt 40-Ampere hour battery (28 Amperes at 5-hour rate).

| FIG. 4 | |
|---|---|
| Curve a: | no Sb addition (new battery) |
| Curve b: | Sb of 102.2 ppm was added to the electrolyte of fully charged battery and charge at 3 Ampere for four minutes |

-continued

FIG. 4

| | |
|---|---|
| Curve c: | After a high current discharge, 60-Ampere discharge to 9 Volts, 16 minutes continuous discharge and then normal 2 ampere charge |
| Curve d: | After charge at 1.5~2.0 Ampere and a large current discharge (60 Ampere, 15 minutes discharge), twice |

Figure 1:
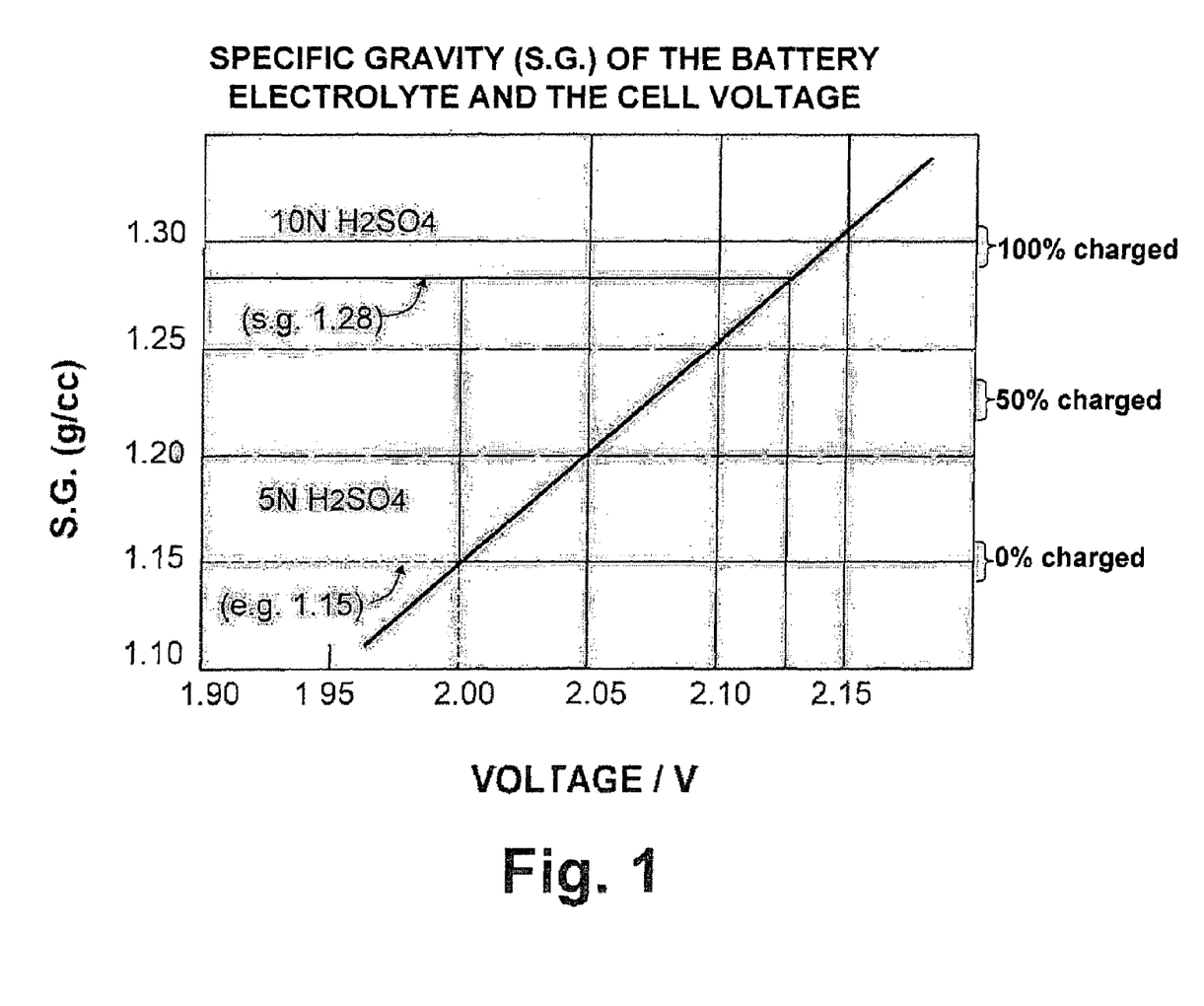
FIG. 1 is a plot of a curve of the specific gravity of the electrolyte of a battery and its voltage.

For 3–10 ton vehicles, 24 volt lead-acid batteries (such as 2 12-volt batteries connected in series) have been used and such batteries would have between 80–155 Ah. The average life of these batteries is typically three years. FIG. 1 shows the voltage and the specific gravity of a normal lead-acid battery using an electrolyte of $H_2SO_4$. When the battery is fully charged, the general value of the specific gravity is about 1.28 g/cc (10N $H_2SO_4$) and decreases to generally about 1.15 (5N $H_2SO_4$) when effectively discharged. The cell reaction of the negative electrode is:

$$PbSO_4(\text{active form}) + H_2SO_4 \underset{\text{discharged}}{\overset{\text{charged}}{\rightleftarrows}} Pb(\text{active form}) + H_2SO_4$$

The porous active form of $PbSO_4$ is converted to fine active metallic lead and $H_2SO_4$ is generated. Therefore, after the normal charging is complete, the $H_2SO_4$ concentration increases as does the specific gravity to 1.28 or higher. In the deteriorated lead-acid battery, the active $PbSO_4$ powder is converted to crystalline lead sulfate, which is difficult to charger back to the fine active lead using a normal charge under normal charging conditions. The additive of this invention can effectively allow the conversion of the crystalline $PbSO_4$ to the porous active form.

Figure 2:
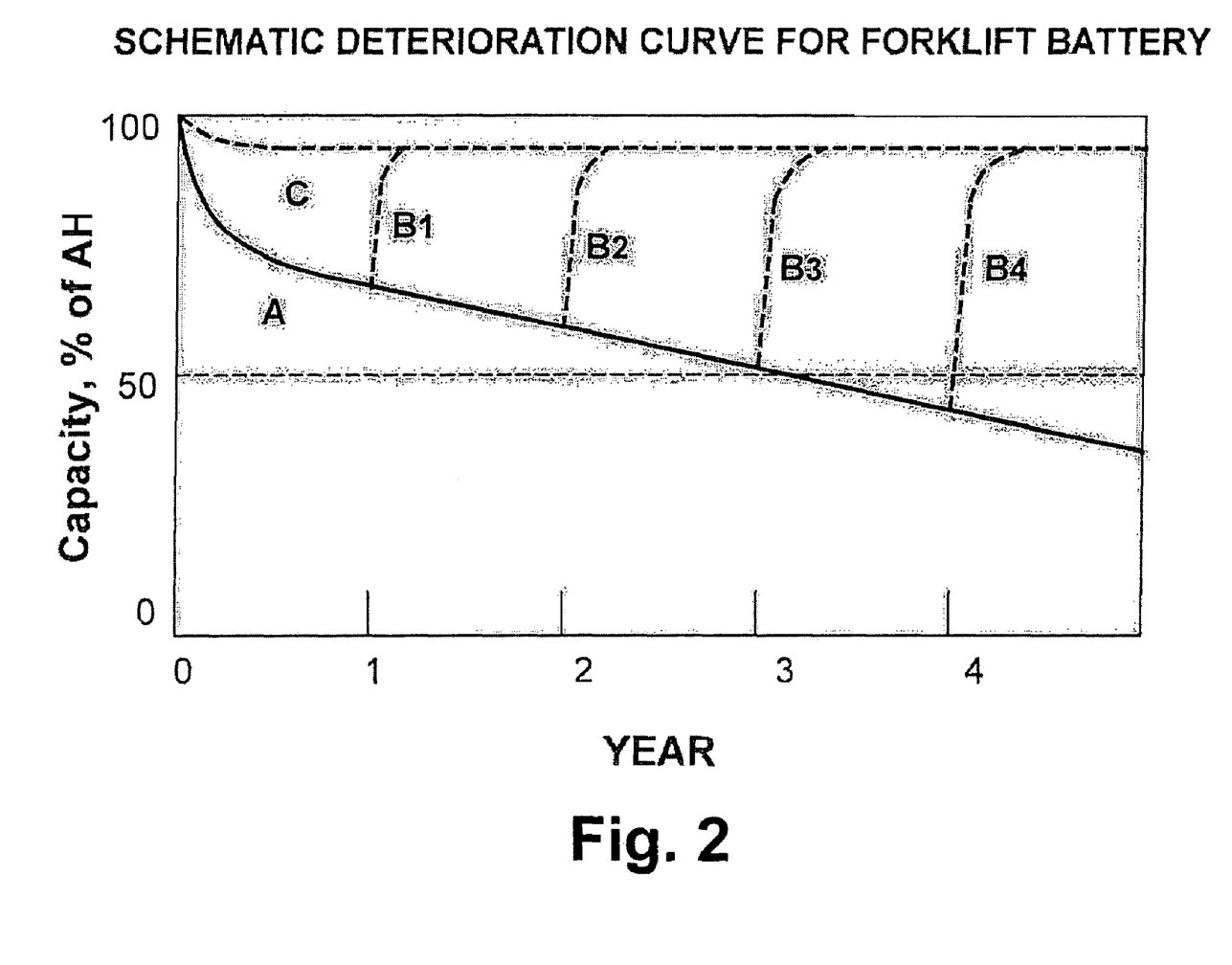
FIG. 2 is a plot of a curve of the deterioration of a battery showing the capacity (% AH) versus time.
Figure 3:
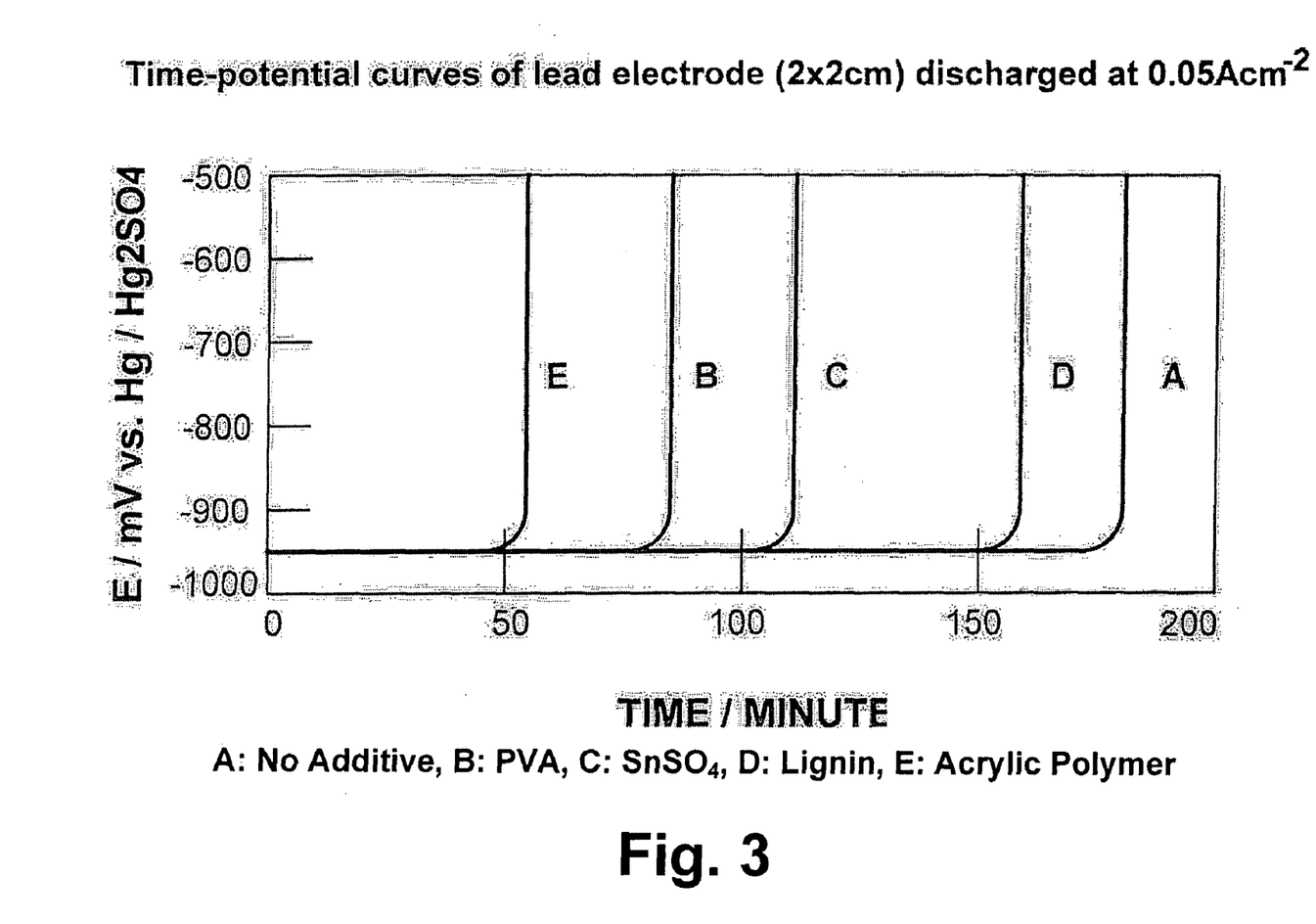
FIG. 3 shows plots of the time potential curves of a lead electrode.

The organic polymers of this invention are adsorbed onto the electrode and slow down the $PbSO_4$ formation process (FIG. 2). When a flat lead plate is anodized (discharged) at a constant current (0.05 mA/cm$^2$), the produced $Pb^{2+}$ ($Pb^0 \rightarrow Pb^{2+}$) combines with $SO_4^{2-}$ (sulfate ion) and produces a $PbSO_4$ deposit on the electrode surface when the organic polymer is added to the electrolyte. The organic polymer and $SnSO_4$, lignin, etc., are adsorbed on the electrode and they influences the $PbSO_4$ deposition as shown in FIG. 3. These results shown in FIG. 3 indicate that the additive material has a clear effect on the electrode reaction. The reaction consists of two steps (1 and 2):

$Pb_0 \rightarrow Pb^{2+} + e$ (charge transfer)   (1)

$Pb^{2+} + SO_4^{2-} \rightarrow PbSO_4$ (precipitation)   (2)

It is not known which step (1 or 2) has a more significant effect to produce the overall beneficial effect. The beneficial effect observed is the increase in the specific gravity or removal of sulfation (removal of crystalline $PbSO_4$ deposit) from the negative electrode or some from the positive electrode. The beneficial effect is confirmed from the increase in the specific gravity of the electrolyte. The specific gravity increase is proportional to the increase in the battery's AH (Operation time).

The high rate discharge current is a very important factor for producing fine (high surface area) lead sulfate. When the battery is discharged and left uncharged, the produced $PbSO_4$ will recrystallize to produce large crystalline $PbSO_4$, resulting in a dead battery. This type of deterioration is called "sulfation". To reactivate the sulfated dead battery, a low current-long time (slow) charging is known to be effective, since the dissolution rate of $PbSO_4$ is very slow when the crystallite size is large. The dissolved lead was ($Pb^{2+}$ in $H_2SO_4$) deposited as metal. The polymer additive is very effective for producing a high surface area (active) metallic lead. Therefore, the polymer additive is effective under a charging for battery regeneration (recovery from sulfation).

A high current discharge (0.3 C or greater, 2C–3C or higher for 4 minutes or more is preferred) produces a high surface area $PbSO_4$. This is the first step in making an active battery. When our additives are added to the acid electrolyte, the fine (high surface area) $PbSO_4$ is converted into fine metallic lead (active negative electrode). Repeated high rate discharging-charging is very important to make the deteriorated battery active in the presence of the organic polymer in the electrolyte. To prolong the battery life, it is recommended to keep the battery always in the active state by adding the novel additives to the electrolyte from the beginning of battery use. The effect of the organic polymer and ultra fine lignin additives upon discharge produces on the surface of a lead electrode a fine $PbSO_4$ that is converted to fine metallic lead.

Old battery electrolytes usually have some dissolved impurities (usually antimony dissolved from grid alloy of the positive plate). Antimony addition markedly reduces the hydrogen overvoltage for the negative electrode and effectively there is no effect on the positive electrode. When a tin or indium compound is added, for example, 100–300 ppm to the sulfuric acid solution, the curve of the negative electrode vs. a cadmium reference electrode shifts to a more negative value. This means that the hydrogen overpotential is increased. The tin or indium is probably deposited on the electrode and covers the antimony deposited hydrogen evolution sites. These metallic additives, lead sulfate and barium sulfate, are preferably used because they are effective for quick battery improvement.

Eight discarded 6-volt 150 AH lead-acid batteries examined and the results are shown in Table 1.

TABLE 1

| Battery No. | Capacity | Volts | Specific Gravity |
|---|---|---|---|
| 1 | 150 | 5.9 | LG |
| 2 | 150 | 6.1 | 1140 |
| 3 | 150 | 5.7 | 1200 |
| 4 | 150 | 5.8 | 1180 |
| 5 | 150 | 5.5 | 1160 |
| 6 | 150 | 4.9 | 1200 |
| 7 | 150 | 5.0 | 1120 |
| 8 | 150 | 5.9 | LG |

For the batteries of Table 1, 15 cc of the 5% organic polymer solution (activator) and deionized water were added to the indicated water level in each battery. The eight batteries were then charged at 8.0 Amperes for 24 hours. This was followed by charging at 3.0 Amperes for four days for reactivation. This long low current charge is to remove any sulfation in order to reactivate the negative electrode. After the 4-day low current (3 Amperes) continuous charge, the specific gravity of the electrolyte and the voltage had increased, as shown in Table 2. The specific gravity values and the battery voltages had recovered to almost their normal fully-charged levels. These regenerated batteries were tested using a 200-Ampere 5-sec. test. These results are shown in Table 3.

TABLE 2

Specific Gravity and Voltage of the Activation Operation at 3 Amperes For 4 Days.

| Battery No. | Specific Gravity | Volts |
|---|---|---|
| 1 | 1250 | 6.30 |
| 2 | 1250 | 6.24 |
| 3 | 1250 | 6.24 |
| 4 | 1250 | 6.32 |
| 5 | 1250 | 6.22 |
| 6 | 1250 | 6.31 |
| 7 | 1250 | 6.15 |
| 8 | 1250 | 6.17 |

TABLE 3

200 Amp-5 Sec. Test Results of Regenerated Batteries.

| Battery No. | OCV | CCV (5 sec after 200 amp.) |
|---|---|---|
| 1 | 6.27 | 4.87 OK |
| 2 | 6.22 | 3.97 — |
| 3 | 6.22 | 4.35 — |
| 4 | 6.29 | 4.66 OK |
| 5 | 6.19 | 4.84 OK |
| 6 | 6.28 | 4.75 OK |
| 7 | 6.12 | 4.60 OK |
| 8 | 6.15 | 4.56 OK |

The lead-acid batteries for use in forklifts are rated at 350 to 650 AH and 48 volts. The typical life of these batteries is 4 to 5 years.

As shown in FIG. 2, these batteries gradually deteriorate. For the first year, the deterioration is 15% or more, and then for the second year and beyond, the deterioration is 7–10% per year. When the polymer (15 cc of the 5% polymer solution) is added to these types of batteries, the battery Ampere-hours remains almost constant at 95–96% of the original rating. As shown in FIG. 2, curve A shows the deterioration of the battery when no polymer additive is used. The AH capacity of the battery decreases to less than 40% after four to five years. Curve B shows the recovery from deterioration of the battery with the polymer additive in the electrolyte. Curve C shows the deterioration of a new battery when the polymer additive is added to the electrolyte once a year from the beginning. This shows that regardless of the age of the battery, the partially deteriorated battery will recover to 85% to 90% of its original AH. Some polymers may effect the water, and in some applications, water may be added to the battery. A combined battery activation method of a high or large current discharge and an organic polymer and ultra fine lignin additions are far more effective compared to the polymer addition only, or only a large current discharge. To support this conclusion, experimental tests were performed and electron microscope pictures of the discharge products ($PbSO_4$) were studied. The results showed that the discharged product became finer when the discharge current became higher. A high current rate is at least 0.3 C, preferably 1.5 C to 2 C and higher for at least 5 minutes. A large current discharge can be accomplished by shorting the battery through a resistance for 1 to 10 minutes and if its resistance is cooled (as in water), then the time of discharge can be increased to 20 minutes. Once finer lead sulfate is produced, the battery's active material remains fine regardless of the subsequent operation. A large current discharge is common for engine starting for 2 to 5 seconds. The current is 1 C to 2 C for most engine starting. For a 40-Ampere hour battery, the engine starting requires 50 to 75 Amperes for 2 to 5 seconds. Preferably, high current discharge is 1 to 20 minutes of continuous discharge at 1 C to 3 C rate, by which the 10 to 60% of the active material is converted to fine $PbSO_4$ from metallic lead. The fine $PbSO_4$ (lead sulfate) becomes a nucleus for the subsequent charge-discharge operation and the active material remains active. Also, the toxic antimony effect disappears upon the large current discharge. Two to six percent of antimony is in the grid alloy (Pb—Sb) of the positive electrode. The antimony (Sb) dissolves slowly into the sulfuric acid electrolyte (5M $H_2SO_4$, 28% $H_2SO_4$). The dissolved antimony ion ($SB^{3+}$ or $Sb^{5+}$) moves to the negative plate and deposits there. The antimony deposits become hydrogen gas evolution sites, since the hydrogen evolution takes place much more easily at the Sb surface compared to the Pb surface. One of the main causes of lead acid battery deterioration is due to the antimony effect. Since the hydrogen evolution reaction (1) and charge reaction (2) of the negative electrode are competitive reactions during the charge process:

$$H+ +e- \rightarrow H_2 \uparrow \quad (1)$$

$$PbSO_4 \rightarrow Pb^{2+} +e- \rightarrow Pb° \text{ (metallic)} \quad (2)$$

The reaction (1) takes place when the charge voltage is 16 to 17 volts at pure lead electrode and takes place at around 14 to 15 volts at Sb deposited-Pb electrode. Therefore, when the solution has Sb, water electrolysis significantly takes place so that all the charge current is not utilized for the charge reaction (2). This means in the presence of Sb, the charge is not efficient and uncharged $PbSO_4$ remains in the electrode and becomes so-called sulfation (formation of crystalline $PbSO_4$) and the battery starts to deteriorate. FIG. 4 shows the large current discharge effect. The toxic effect of Sb (lowers the battery voltage upon charge) is shown by curve b. Namely, addition of Sb (102.2 ppm in the electrolyte) makes the current voltage curve move from (a) to (b). After a large current discharge, the curve shifts from (b) to (c) and further shifts from (c) to (d) after two times of discharge-charge operation (the discharge being a large current discharge, 60 Amp-15 min.). The beneficial action of lignin is the high hydrogen overpotential compared to carbon and lignin is easy to grind to fine particles compared to carbon. A 5% PVA mixture aqueous solution with and without varying sizes of lignin particles was added to a 5 cc/cell deteriorated lead acid battery. The battery was repeatedly charged-discharged three times. The results of these tests are shown in Table 4.

TABLE 4

| | | Specific Gravity | |
|---|---|---|---|
| | Average Size of Lignin* | Before Charge | After Charge |
| Sample 1 | 0.3 | 1.28 | 1.32 |
| Sample 2 | 2.0 | 1.24 | 1.30 |
| Sample 3 | no lignin | 1.19 | 1.26 |

*micron

TABLE 5

|  | Average Size of Lignin* | 150 Ampere 5-Second Test Voltage at 5 Seconds |
|---|---|---|
| Sample 1 | 0.3 | 11.4–11.5 Volt |
| Sample 2 | 2.0 | 11.1–11.2 Volt |
| Sample 3 | no lignin | 10.8–11.0 Volt |

*micron

The results demonstrate that the finer the lignin size, the battery activation effect is much better. Ultra fine particles (0.01–0.8 micron) and $PbSO_4$ and/or $BaSO_4$ can be added to the battery and deposit on the negative electrode. The deposit of $BaSO_4$ and/or $PbSO_4$ can act as a nucleus of $PbSO_4$ formation; therefore the battery electrode can be easily activated.

It is to be understood that modifications and changes to the preferred embodiments of the invention herein can be made without departing from the spirit and scope of the invention.

What is claimed:

1. An electrochemical lead-acid battery having a sulfuric acid electrolyte containing an organic polymer and an ultra fine coniferyl alcohol lignin having a particle size between about 0.01 and about 0.8 micron.

2. The electrochemical lead-acid battery of claim 1 wherein the ultra fine coniferyl alcohol lignin has a particle size between 0.1 and about 0.6 micron.

3. The electrochemical lead-add battery of claim 2 wherein the sulfuric acid electrolyte also contains at least one additional additive selected from the group of materials consisting essentially of indium, tin, lead sulfate, barium sulfate, and mixtures thereof.

4. The electrochemical lead-acid battery of claim 1 wherein the organic polymer is at least one organic polymer selected from the group consisting essentially of polyacrylic acid or its copolymers, polyvinyl alcohol and ethylene glycol.

5. The electrochemical lead-add battery of claim 1 wherein the sulfuric acid electrolyte also contains at least one additional additive selected from the group of materials consisting essentially of indium, tin, lead sulfate, barium sulfate and mixtures thereof.

6. The electrochemical lead-acid battery of claim 5 wherein the electrolyte also contains an antimony as an impurity.

* * * * *

UNITED STATES PATENT AND TRADEMARK OFFICE
CERTIFICATE OF CORRECTION

PATENT NO. : 7,160,645 B2  Page 1 of 1
APPLICATION NO. : 10/634592
DATED : January 9, 2007
INVENTOR(S) : Kozawa et al.

It is certified that error appears in the above-identified patent and that said Letters Patent is hereby corrected as shown below:

On the title page, item [75]:

In the inventors: correct "Glym Yoko" to read --Gijun Yokoi.--

On the title page, insert item [63]:
This is a Continuation-in-Part application of application 10/439,258 filed 05/15/30.

Add: Foreign Priority:

JP 2002-141177 05/2002

JP 2003-185790 05/2003

JP 2003-185791 05/2003

Signed and Sealed this

Sixth Day of May, 2008

JON W. DUDAS
*Director of the United States Patent and Trademark Office*